United States Patent [19]

Crickmer

[11] E Re. 30,988

[45] Reissued Jul. 6, 1982

[54] WELL TOOL

[75] Inventor: Charles D. Crickmer, Houston, Tex.

[73] Assignee: Otis Engineering Corporation, Dallas, Tex.

[21] Appl. No.: 192,096

[22] Filed: Sep. 29, 1980

Related U.S. Patent Documents

Reissue of:

[64] Patent No.: 4,047,565
Issued: Sep. 13, 1977
Appl. No.: 671,209
Filed: Mar. 29, 1976

[51] Int. Cl.[3] ..... E21B 33/129

[52] U.S. Cl. ..... 166/217; 166/65 M

[58] Field of Search ..... 166/217, 206, 208, 65, 166/120, 134, 118, 65 M

[56] References Cited

U.S. PATENT DOCUMENTS

| | | | |
|---|---|---|---|
| 2,623,593 | 12/1952 | Pennington et al. | 166/217 |
| 2,982,358 | 5/1961 | Brown | 166/120 |
| 3,195,646 | 7/1965 | Brown | 166/216 |
| 3,871,447 | 3/1975 | Crowe | 166/120 |

*Primary Examiner*—James A. Leppink
*Attorney, Agent, or Firm*—Vinson & Elkins

[57] ABSTRACT

A well tool and more particularly a hanger assembly having an improved design for more effectively, reliably and economically hanging a liner or other well equipment in a well casing or the like.

15 Claims, 6 Drawing Figures

WELL TOOL

Matter enclosed in heavy brackets [ ] appears in the original patent but forms no part of this reissue specification; matter printed in italics indicates the additions made by reissue.

The invention relates to a well tool known in the art as a hanger for hanging liners and other such well equipment within well casing and the like. For convenience, the invention will be described with reference to a liner hanger.

Liner hangers are usually employed to attach an inner string of well casing to the lower end or at some other point of a larger diameter well casing. Liner hangers ordinarily comprise an apparatus attachable to the liner and including a set of casing gripping slips which are arranged to be moved into gripping engagement with the interior of the larger diameter casing to thereby secure the smaller diameter casing or liner thereto. Thereafter, the liner will frequently be cemented, which requires the circulation of fluids through the interior of the liner and upwardly about the exterior thereof between the liner and the outer casing or well bore.

Usually, the liners comprise long and heavy strings of casing extending below the hanger and therefore require large slip contact areas in order to assure effective attachment of the liner within the larger casing. However, because of the close clearances which must frequently exist between the liner and the surrounding well casing providing sufficient slip area to support a long and heavy liner string will frequently tend to greatly decrease the annular space between the liner and the surrounding well wall, thus severely restricting the flow of fluid necessary in cementing of the liner and increasing the probability of the hanger sticking in the well bore when it is being lowered or "run-in" into the well.

It has been recognized in the art as is exemplified by U.S. Pat. No. 3,195,646, issued July 20, 1975 by C. Brown, that by placing a plurality of axially spaced slip sets on the hanger mandrel it is possible to provide sufficient slip contact area in order to assure effective attachment of the liner within the well casing and also to provide sufficient annular space between the liner and the surrounding well casing for sufficient fluid flow. It is common in the prior art to provide a circumferential collar which is axially slidable with respect to the hanger mandrel and to which are connected a plurality of spring arms for the purpose of mounting the slips (as can be seen in FIGS. 1 and 2 of the Brown patent). Upon relative movement between the collar and the hanger mandrel the tapered slips engage oppositely tapered cones, thereby wedging the slips outwardly into gripping engagement with the inside wall of the well casing. Since the spring arm is secured from radial movement at the connection with the collar, the slip will have the undesirable tendency to pivot or cock with respect to the cone thereby producing only a partial engagement between the serrated surface of the slip and the inner surface of the well casing. Also, where slips are supported by spring arms as shown by Brown it is necessary that for each set of slips there be a corresponding collar to which the spring arms are attached, and in order to reduce the chance of cocking of the slip, it is necessary to provide relatively long spring arms.

Therefore, this configuration dictates that the hanger have a substantial overall length increasing the possibility of the hanger sticking in the well casing during run-in thereof.

It is an object of the present invention to provide a novel well tool which overcomes the above-cited disadvantages by utilizing a unique slip-cone arrangement having a plurality of axially spaced slip sets wherein a single collar or rein housing may be used to mount a plurality of slip sets, and wherein nonbending slip reins which move parallel to the liner hanger mandrel are substituted for spring arms alleviating the possibility of the slips cocking on the cone, thereby producing a hanger which is more effective and substantially shorter than those of the prior art.

It is a further object to provide an inexpensive slip-cone arrangement wherein the slip reins move radially outwardly from the hanger mandrel in a manner parallel to the axis of the mandrel to alleviate the possibility of the slips cocking on the cones.

Other objects and advantages will become apparent to one of ordinary skill in the art from the following detailed description of preferred embodiments of the invention when read in conjunction with the accompanying drawings wherein.

Figure 1:
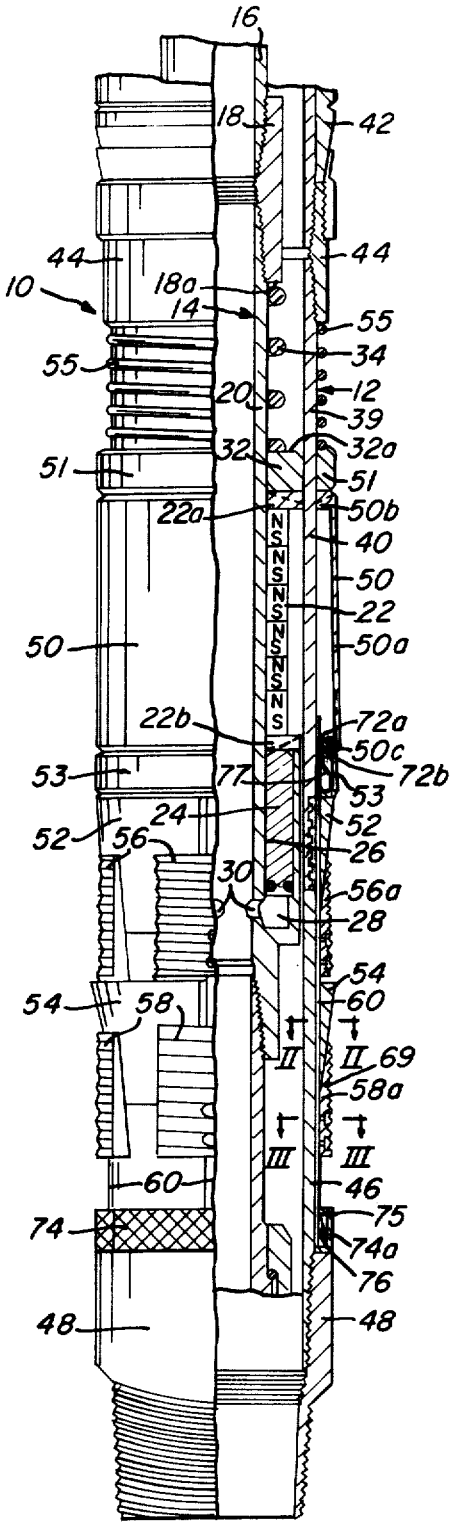
FIG. 1 is a longitudinal quarter-sectional view of a liner hanger including one embodiment of the novel slip-cone arrangement of the present invention.

Referring to the drawings, and FIG. 1 in particular, a liner hanger and setting tool assembly 10 is depicted in the run-in or nonactuated position. The assembly 10 includes a generally tubular liner hanger 12 and a generally cylindrical setting tool 14 coaxially inserted within the hanger 12. The setting tool 14 is releasably secured to the liner hanger 12 in any well known manner (not shown) such as that described in U.S. Pat. No. 3,291,220 so that the entire assembly 10 may be lowered into a well casing C (FIG. 4) as a unit by a run-in string (not shown) until such time as the liner hanger is positioned at the desired location and set. The setting tool 14 can then be detached and removed therefrom (see FIG. 5).

The setting tool 14 is lowered into a well and supported from the surface by a run-in string (not shown) connected to a setting tool connecting assembly (not shown) which in turn is connected to member 16 and coupling 18. Connected below the coupling 18 is a setting tool tubular mandrel 20 fabricated of a nonmagnetic material such as stainless steel. (It is noted that for purposes of this specification the term "nonmagnetic" material refers to any material which will not conduct a substantial amount of magnetic flux and thus will allow the lines of flux to pass directly therethrough substantially unabated, and the term "magnetic" material refers to any material which may be magnetically coupled to a magnet by means of a magnetic force field.) An annular magnet 22 is slidably positioned coaxially around the setting tool mandrel 20 and is preferably fabricated of vertically stacked annular permanent magnets. Directly above and below the magnet structure 22 are situated annular magnetic pole pieces 22a and 22b fabricated of soft iron or the like and which may be tapered radially outward as indicated by the broken lines for a purpose to be explained hereinafter.

An annular nonmagnetic piston 24 slidably surrounds mandrel 20 and is positioned below lower pole piece 22b within an annular nonmagnetic cylinder 26. The cylinder 26 along with piston 24 define an annular, sealed variable volume hydraulic fluid chamber 28 having circumferentially spaced inlet ports 30 extending through the wall of mandrel 20 to allow hydraulic fluid to pass from the interior of mandrel 20 to the chamber 28 for reasons to be fully explained hereinafter. Above upper pole piece 22a is situated an annular magnetic insulator 32 of nonmagnetic material. A helical compression spring 34 surrounds mandrel 20 and extends between a radially outwardly extending face 18a of coupling 18 and a radially outwardly extending face 32a of insulator 32. The spring 34 serves to positively bias the setting tool magnet 22 in a nonactuated position until such time as it is desired that it be actuated by pressurizing hydraulic fluid in chamber 28 as will be explained hereinafter.

Figure 4:
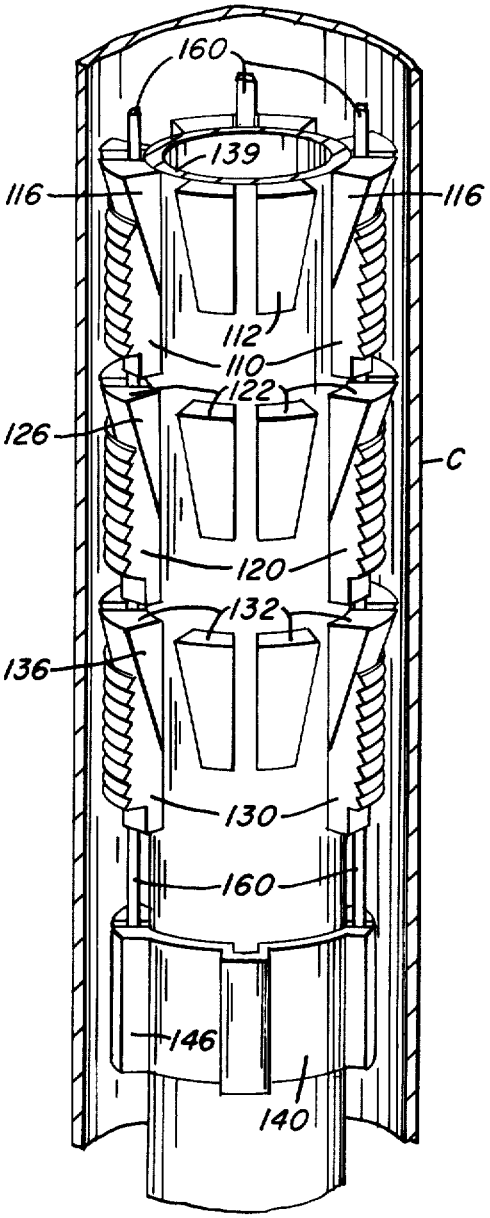
FIG. 4 is a perspective view of an alternate embodiment of the invention showing the nonactuated or run-in position and wherein one rein and the associated slips thereof have been removed for purposes of clarity.

The liner hanger 12, is, as explained hereinbefore, initially releasably connected to setting tool 14 and extends circumferentially therearound in a coaxial relationship therewith (FIGS. 1 and 4). The liner hanger includes a tubular mandrel 39 comprised of a nonmagnetic portion 40 and preferably a lower mandrel portion 46 of any suitable rigid material attached therebelow in a manner to form smooth interior and exterior surfaces at the junction thereof.

The nonmagnetic portion 40 completely surrounds magnet 22 and pole pieces 22a, 22b of setting tool 14 and extends vertically a distance at least as great as the extent of possible vertical movement of upper pole piece 22a. The upper end of nonmagnetic mandrel portion 40 may be secured to any of a number of well tools such as a well known packer assembly 42 (only a portion of which is shown) by a threaded coupling 44. A conventional coupling 48 is shown on the lower end of mandrel 39 for the connection of a conventional liner (not shown).

Slidably supported on mandrel portion 40 is an annular magnet-follower member 50 of a magnetic material. Member 50 has a tubular main body portion 50a which is coaxial with mandrel portion 40 and which is spaced slightly outwardly therefrom by upper and lower radially inwardly extending annular flanges 50b and 50c which may be tapered radially inwardly as shown by the broken lines for reasons to be explained hereinafter. As shown, the flanges 50b and 50c are situated to correspond to the vertical positions of respective pole pieces 22a and 22b. Respectively above and below member 50 are vertically movable annular nonmagnetic members 51 and 53. Placed between the upper member 51 and coupling 44 is a helical compression spring 55 having a low spring force relative to the helical spring 34 on the setting tool 14.

Figure 2:
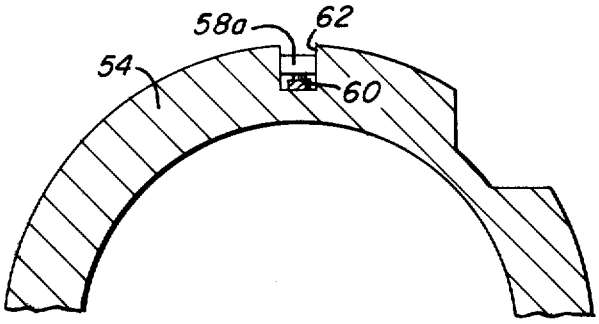
FIG. 2 is an enlarged partial cross-sectional view of the liner hanger taken along line II—II of FIG. 1.
Figure 3:
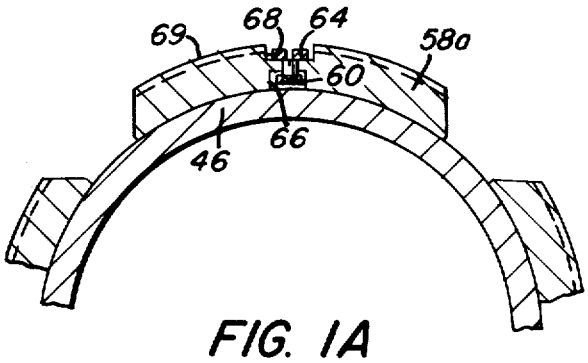
FIG. 3 is an enlarged partial cross-sectional view of the liner hanger taken along line III—III of FIG. 1.

Surrounding mandrel 39 are annular tapered members 52 and 54 known in the art as "cones." The cones 52 and 54 may be affixed by any suitable means to mandrel portion 46 and preferably are formed unitarily therewith. As shown, the walls of the cones gradually increase in thickness from the axial lower end to the upper end thereof. Adapted to slidably engage the cones are, preferably, two axially spaced sets of serrated gripping members 56 and 58 known as "slips" in the art. Each set of slips comprises a plurality of individual slips, preferably four, which are equally spaced around the respective cones associated therewith. With particular reference to FIG. 1 it can be seen that each individual slip of slip set 56 (for example slip 56a) is situated directly above and is connected to an individual slip (in the EXAMPLE, slip 58a) of slip set 58 by a straight rod or rein 60 of which there are four equally spaced around mandrel 39 and which extend in an axial direction with respect thereto. As can be seen in FIG. 2, the reins 60 may pass through cones 52 and 54 without obstruction by means of slots 62 which are formed axially through the cones 52 and 54. The slots 62 also act to constrain the reins 60 to move in a direction substantially parallel to the axis of the mandrel 39 while allowing the reins 60 to move radially with respect to the mandrel 39 to a limited extent. It is noted that between the slots 62, the cones may be either solid as shown on the left side of FIG. 2 or they may be fluted as shown on the right side of FIG. 2, for the purpose of creating a greater fluid flow area between the hanger 12 and the casing C (FIGS. 4 and 5) for reasons well known in the art. With particular reference to FIGS. 1 and 3, it can be seen that the slips of slip sets 56 and 58 are securely attached to the reins 60 by any suitable means such as by screws 64 which pass through the slips into axial slots 66 in the slips to provide a space for the reins to contact the slips without precluding contact of the inner surface of the slips with the mandrel 46. Further, the screw heads are countersunk in the slips as at 68 to allow unobstructed contact between the outer serrated surface 69 of the slips with a well casing when the slips are actuated as will be more fully explained hereinafter.

Figure 1A:
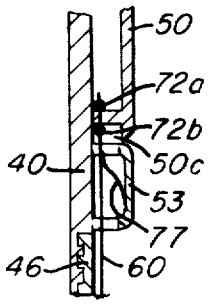
FIG. 1A is an enlarged cross-sectional view of a portion of FIG. 1.

The upper ends of the reins 60 pass through the annular vertically movable magnetic insulator member 53 having slots therethrough for this purpose and also through slots in the lower annular flange 50c of member 50. A plurality of pins 72a and 72b (see FIG. 1A) couple the reins to the member 50 for captive vertical movement therewith in a manner allowing limited radial movement of the reins as will be further explained. The lower ends of the reins 60 are mounted in an annular vertically movable rein housing 74 having an axially extending flange 74a. Connected between the lower end of the reins and the flange 74a by means of pins 75 is a compression spring means 76, which may be of any suitable construction, biasing the reins radially inwardly yet allowing radially outward movement of the reins upon a sufficient force being exerted to overcome the spring force. It is noted that if desired a compression spring means 77 could also be placed in magnetic insulator member 53 to provide a more positive radial inward bias on the reins.

When it is desired to set the liner hanger in a well casing, the setting tool 14 is mechanically coupled to the liner hanger 12 in a releasable manner by any well known means (not shown) so that the tool 14 and hanger 12 are situated with respect to each other as shown in FIG. 1, i.e., the pole pieces 22a, 22b of magnet 22 are directly opposite the respective flanges 50b, 50c of member 50 and are separated by a gap only slightly greater than the thickness of mandrel 39.

The magnet 22 will produce a magnetic field having lines of flux which travel axially through the magnet 22 and which are directed radially outwardly by pole piece 22a through nonmagnetic mandrel portion 40. The lines of flux then pass into flange 50b and axially downward through member 50, body portion 50a being of magnetic material, and thence radially inwardly through flange 50c passing through mandrel portion 40 back to lower pole piece 22b. The members 32, 51, 53 and 24, all being of nonmagnetic material, help to concentrate the lines of flux into the above-enumerated desired path. In order to further concentrate the lines of flux within the gap between the magnet pole pieces 22a, 22b and the respective flanges 50b, 50c it may be desired to taper the pole pieces radially outwardly and the flanges radially inwardly as shown by the broken lines in FIG. 1. In this manner the member 50 will be magnetically coupled to the magnet 22 for axial movement therewith relative to the mandrels 39 and 20.

In operation, the liner hanger and setting tool assembly is lowered in a "run-in" position (FIG. 1) from the surface into a well casing by means of a "run-in" string (not shown). As the assembly is being lowered, relatively strong spring 34 prevents the magnet 22 from moving upward with respect to the mandrels 20 and 39. Due to the above-described magnetic coupling, member 50 is also held stationary with respect to the mandrels which in turn prevents the reins 60 and the slips sets 56, 58 from moving upwardly and prematurally setting in the well casing. Also, the spring 55 aids in preventing premature movement of the member 50; however, it is important to note that spring 55 on liner hanger 12 is not essential for this purpose, but is primarily included in the assembly to return the slips to the run-in position after being set to allow the hanger to be removed or relocated in the well. It can thus be seen that spring 55 may be very thin so as not to add any thickness to the hanger 12. Also, the slips are prevented from moving radially outwardly by spring means 76 in rein housing 74 during the run-in of the assembly.

When the assembly 10 has reached the desired location within the well casing, it may be actuated by pumping hydraulic fluid, for example water, down into connector 16 or pressurizing fluid already present in the run-in string. The pressurized hydraulic fluid passes through ports 30 in mandrel 20 creating a pressure differential on annular piston 24. When the pressure differential on the piston 24 is sufficient to overcome the forces of spring 34 and that of gravity, the piston 24 will be forced upwardly into the position shown in FIG. 4 pushing the magnet 22 upwardly therewith. The magnetic coupling of member 50 described above is of sufficient force to overcome the force of gravity and spring 55 thus moving member 50 upwardly with respect to hanger mandrel 39.

As the member 50 is moved upwardly with respect to mandrel 39 the slip reins 60 are pulled upwardly therewith forcing the slips sets 56 and 58 to slide upwardly upon the respective cones 52 and 54 which are stationary with respect to mandrel 39. As the slips slide upon the cones, it is evident that the slips must move radially outwardly due to the increasing outside diameter of the cones and the matching angle of the inner surface of the slips. The radial force created by the cones is sufficient to overcome the force of the spring means 76 in the rein housing 74; therefore, the reins may follow the respective slips connected thereto in a radial outward direction within the respective cone slots 62. Since the relative movement of the slips of upper slip set 56 is identical to the relative movement of the slips of the lower slip set 58 the reins 60 will always be in substantially parallel relation to the axis of mandrel 39. This design ensures that substantially the entire serrated surfaces 69 of the slips will engage the interior wall of the well casing (see FIG. 5) to produce a strong engagement therewith.

After the slips have been moved upwardly and outwardly into engagement with the casing, the run-string is lowered slightly to lower the cones with respect to the slips and thereby place the weight of the liner on the slips further driving them radially outward into firm engagement with the inner wall of well casing C. The slips are then able to hold the weight of the entire assembly within the well casing.

After the slips are set in the manner described above, the setting tool 14 is released from engagement with the hanger 12 by well known means, and it may be raised to the surface by the run-in string. If it is desired to relocate the hanger 12 within the well, it is only required that the tool 14 be mechanically reconnected to hanger 12 by means of a well known connecting assembly whereby the hanger may be lifted slightly and by means of gravity and the force of spring 55 the slips will fall back into the original position thereof as depicted in FIG. 1. The hanger may then be relocated to the desired position whereafter the above setting operation is again performed.

Figure 5:
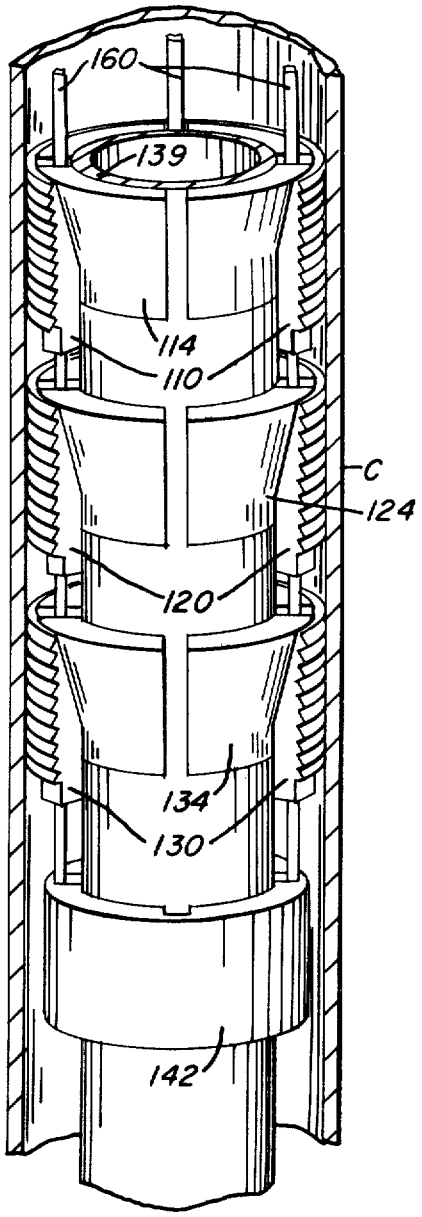
FIG. 5 is a perspective view of the embodiment of FIG. 4, slightly modified, showing the liner hanger in the actuated or set position.

FIG. 4 shows a modified form of the present invention including three axially spaced sets of slips 110, 120, 130 and is shown in the run-in position within a well casing C. FIG. 5 depicts a slightly modified form of the hanger of FIG. 4 and illustrates the set position wherein the serrated surfaces of the slips are in engagement with the inner wall of the well casing C. While each of the embodiments of FIGS. 4 and 5 are adapted to include four circumferentially spaced reins 160, the forwardmost rein and the associated slips thereof have been removed for the sake of clarity. The embodiment of FIG. 4 shows the construction of the cones 112, 122, 132 on mandrel 139 and the rein housing 140 being of a fluted design while the embodiment of FIG. 5 depicts alternative nonfluted cones 114, 124, 134 and a nonfluted rein housing 142. It can be seen that the embodiment of FIG. 4 will allow a greater flow of fluid between the hanger mandrel and the well casing due to the increased flow cross section created by the flutes 116, 126, 136 in the cones and the flutes 146 in the rein housing 140. FIGS. 4 and 5 clearly show that any number of axially spaced cones and associated slip sets may be provided on the hanger mandrel of the present invention. Also it is clear that the reins may be moved axially by any means; the actuator need not be the magnetic device as described hereinabove with respect to the preferred embodiment of FIG. 1. FIGS. 4 and 5 also show a modified form of the rein housing shown in FIG. 1. The rein housings of FIGS. 4 and 5 are stationary with respect to the hanger mandrel and thus do not move along with the rein as the reins are actuated into the set position. Compression spring means (not shown) within the rein housing urge the reins radially inwardly with respect to the hanger mandrel; however, the spring means and rein housing are not connected to the reins as described in the embodiment of FIG. 1. Instead, the bottom end of the rein freely moves axially within the rein housing in slidable engagement with the spring means, and the rein housing has an axial length sufficient to captively surround the ends of the reins throughout the extent of the axial movement thereof.

It is to be particularly noted that while a few preferred embodiments of the invention have been described and shown, it is clear that numerous modifications may be made thereto without departing from the spirit and scope of the invention. For example, the slip reins may be pulled or pushed upwardly by any means including manually; the slip reins may be held axially stationary with respect to the hanger mandrel as axially movable cones are moved into engagement with the slips to thereby force the slips radially outwardly; it is not necessary that each rein carry a slip from each slip set, for example, a hanger having four axially spaced slip sets, each set containing only two slips, may provide four slip reins, each rein secured to only two slips; each slip rein may carry only a single slip. It is therefore requested that the scope of the invention be limited only by the following claims.

What is claimed is:

1. A well tool for suspending well equipment in a well, the well tool comprising:

an elongated hanger mandrel;

a plurality of cones axially spaced on said mandrel;

a plurality of sets of slips axially spaced around said mandrel, each set of slips including a plurality of slips circumferentially spaced around said mandrel and positioned with respect to a different one of said cones to engage said one cone upon relative axial movement between the set of slips and the cone;

a plurality of elongated slip reins circumferentially spaced around said mandrel for controlling alignment of said slips during relative axial movement between the [set] *sets* of slips and the cones, each slip rein being secured to [a of slip from a] *one slip of each set of said* plurality of [said] sets of slips and each slip rein controlling the alignment of each slip to which it is secured.

2. A well tool as specified in claim 1 wherein relative axial movement between said slips and an associated cone produces radial outward movement of said slips.

3. A well tool as specified in claim 1 wherein said reins move radially with respect to said mandrel during relative movement between said slips and said cones and extend substantially parallel to the axis of said mandrel during the entire extent of relative movement between said slips and said cones.

4. A well tool as specified in claim 1 additionally comprising actuator means connected to said reins for producing relative axial movement between said slips and said cones.

5. A well tool as specified in claim 1 wherein said cones are fixed relative to said mandrel and said sets of slips are movable with respect to said mandrel.

6. A well tool as specified in claim 1 wherein each slip set includes a plurality of slips circumferentially and equally spaced around said mandrel, and a slip from one slip set being aligned with a respective slip from each of the other slip sets along a slip axis parallel to the longitudinal axis of said mandrel.

7. A well tool as specified in claim 6 wherein said reins have longitudinal axes coinciding with respective ones of said slip axes.

8. A well tool for suspending well equipment in a well, the well tool comprising:

an elongated hanger mandrel;

a plurality of cones axially spaced on said mandrel;

a plurality of sets of slips axially spaced around said mandrel, each set of slips including a plurality of slips circumferentially spaced around said mandrel and each set of slips being positioned with respect to a different one of said cones and adapted to engage said one cone upon relative movement between the set of slips and the cone;

a plurality of elongated slip reins circumferentially spaced around said mandrel, each slip rein being secured to [a] *one* slip [from a plurality] *of at least two sets* of said sets of slips;

annular rein housing means on said mandrel in communication with said reins; and spring means associated with said annular rein housing means for urging said reins radially inwardly with respect to said mandrel.

9. A well tool as specified in claim 8 wherein said rein housing means is slidable with respect to said mandrel and movable in an axial direction with said reins.

10. A well tool as specified in claim 8 wherein said rein housing means is fixed to said mandrel and a portion of each of said reins moves axially within said housing means.

11. A well tool for supporting well equipment in a well, the well tool comprising:

an elongated hanger mandrel;

at least one tapered cone on said mandrel;

at least one set of slips spaced around said mandrel, including a plurality of slips circumferentially spaced around said mandrel and positioned to engage said cone upon relative axial movement between the set of slips and the cone;

elongated rein means for supporting each slip around said mandrel, said rein means extending substantially parallel to the longitudinal axis of said mandrel during the entire extent of relative axial movement between the set of slips and the cone and extending beyond both axial limits of said set of slips;

annular rein housing means on said mandrel and in communication with one axial end portion of said rein means;

spring means in said housing means for urging said rein means radially inwardly with respect to said mandrel.

12. A well tool as specified in claim 11 additionally comprising actuator means on said mandrel connected to the other axial end portion of said rein means for axially moving said rein means and the slips connected thereto with respect to said cone.

13. A well tool for suspending well equipment in a well, the well tool comprising:

an elongated hanger mandrel;

at least one tapered cone on said mandrel;

at least one set of slips including a plurality of slips circumferentially spaced around said mandrel and positioned to engage said cone upon relative axial movement between said set of slips and said cone;

elongated rein means for supporting each slip around said mandrel, said rein means movable radially outwardly with respect to said mandrel and extending substantially parallel to the longitudinal axis of said mandrel during the entire extent of relative axial movement between the set of slips and the cone.

14. A well tool as specified in claim 13 additionally comprising:

at least one other tapered cone on said mandrel and axially spaced from said first mentioned cone;

at least one other set of slips on said mandrel and axially spaced from said first mentioned set of slips including a plurality of slips circumferentially spaced around said mandrel and positioned relative to said other cone for engagement therewith upon relative axial movement between said other set of slips and said other cone;

said rein means supporting said other set of slips and including a plurality of elongated reins, each elongated rein being secured to [a] *one* slip [from] ~~of~~ each of said sets of slips.

15. The well tool of claim 13 wherein:

said cone includes axial slot means therein; and said rein means extend through said slot means, extend beyond the axial limits of said cone, are constrained to move in a direction substantially parallel to the axis of said mandrel by said slot means, and are allowed to move radially with respect to said mandrel by said slot means.

* * * * *